(12) United States Patent
Fitzgerald

(10) Patent No.: US 8,931,361 B2
(45) Date of Patent: Jan. 13, 2015

(54) ELECTRIC VEHICLE TRANSMISSION

(75) Inventor: Simon Paul Fitzgerald, Glenwood (AU)

(73) Assignee: NT Consulting International Pty Limited, Castle Hill, New South Wales (AU)

( * ) Notice: Subject to any disclaimer, the term of this patent is extended or adjusted under 35 U.S.C. 154(b) by 65 days.

(21) Appl. No.: 13/576,864

(22) PCT Filed: Feb. 4, 2011

(86) PCT No.: PCT/AU2011/000121
§ 371 (c)(1),
(2), (4) Date: Nov. 22, 2012

(87) PCT Pub. No.: WO2011/094821
PCT Pub. Date: Aug. 11, 2011

(65) Prior Publication Data
US 2013/0065729 A1    Mar. 14, 2013

(30) Foreign Application Priority Data

Feb. 5, 2010 (AU) ................................ 2010900680

(51) Int. Cl.
| | |
|---|---|
| *F16H 3/08* | (2006.01) |
| *B60L 15/20* | (2006.01) |
| *B60L 3/00* | (2006.01) |
| *F16H 61/12* | (2010.01) |
| *F16H 3/089* | (2006.01) |
| *F16H 61/00* | (2006.01) |

(52) U.S. Cl.
CPC .......... *B60L 15/2054* (2013.01); *B60L 3/0023* (2013.01); *F16H 61/12* (2013.01); *F16H 3/089* (2013.01); *F16H 61/0025* (2013.01)
USPC ................................................. 74/333; 74/335

(58) Field of Classification Search
USPC ................ 192/48.605, 611, 614; 74/333, 335
See application file for complete search history.

(56) References Cited

U.S. PATENT DOCUMENTS

| | | | | | |
|---|---|---|---|---|---|
| 2,884,813 | A | * | 5/1959 | Kelley | 475/120 |
| 3,041,892 | A | * | 7/1962 | Schjolin | 475/48 |
| 3,614,902 | A | * | 10/1971 | Candellero | 74/555 |
| 5,030,182 | A | * | 7/1991 | Frost | 475/204 |
| 8,409,053 | B2 | * | 4/2013 | Samie et al. | 477/5 |
| 8,556,760 | B2 | * | 10/2013 | Mack et al. | 475/152 |
| 2002/0137591 | A1 | * | 9/2002 | Frost | 475/288 |
| 2010/0261574 | A1 | * | 10/2010 | Samie et al. | 477/5 |

* cited by examiner

*Primary Examiner* — Justin Holmes
(74) *Attorney, Agent, or Firm* — Quarles & Brady LLP

(57) ABSTRACT

An electric vehicle transmission, the transmission comprising an input shaft arranged to be driven by an electric motor, an output shaft arranged to transfer drive from the input shaft to driving wheels of the vehicle to which the transmission is fitted, a first clutch for engaging/disengaging a first gear ratio of the transmission, a second clutch for engaging/disengaging a second gear ratio of the transmission, and a fluid pump driven in response to rotation of the output shaft, wherein the first clutch is biased to engage said first gear ratio in the absence of pressure from the fluid pump.

19 Claims, 1 Drawing Sheet

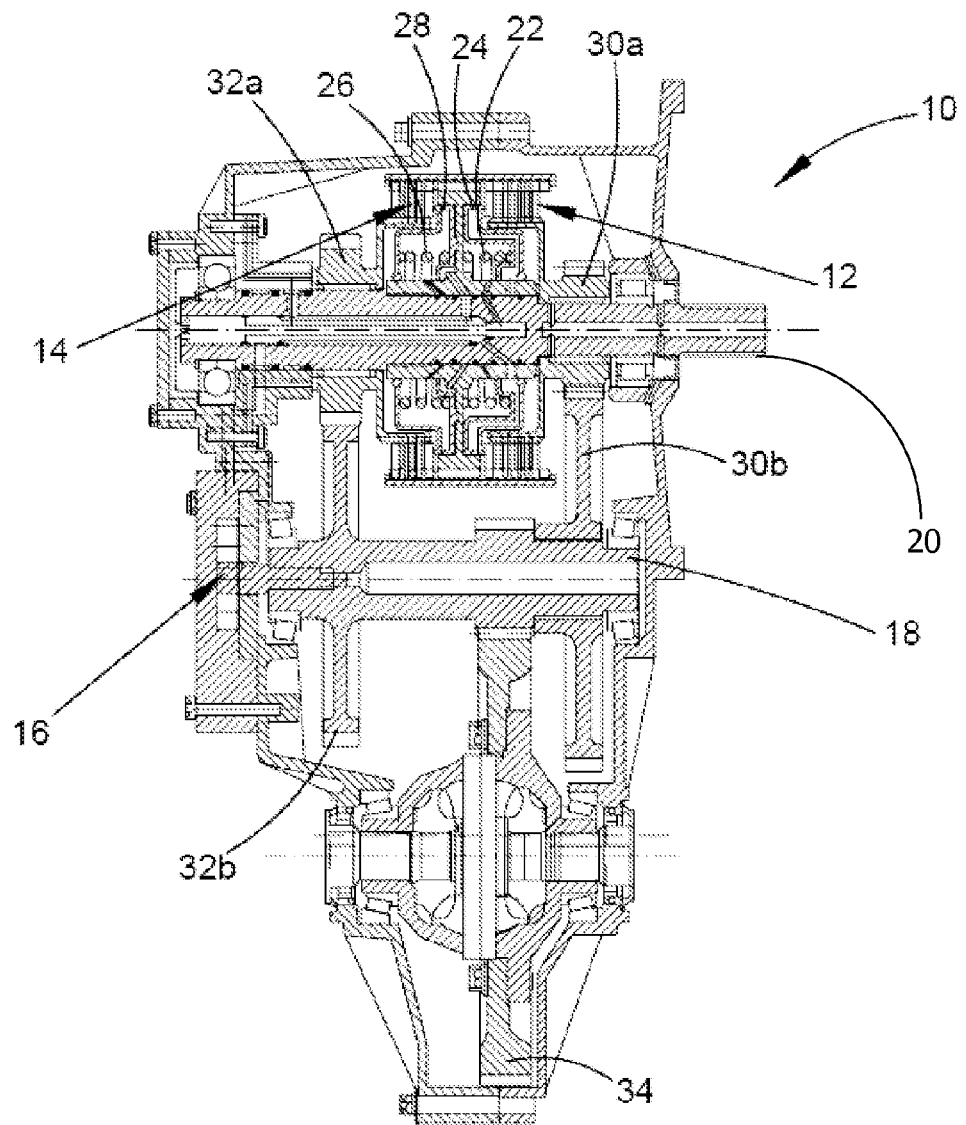

ELECTRIC VEHICLE TRANSMISSION

This application is a 35 U.S.C. §371 national stage filing of International Application No. PCT/AU2011/000121, having an international filing date of Feb. 4, 2011. This application claims the benefit of priority to Australian Patent Application No. 2010900680, filed Feb. 5, 2010. The entire contents of each of the above-referenced applications are expressly incorporated herein by reference.

FIELD OF THE INVENTION

This invention relates to an electric vehicle transmission and, more particularly but not exclusively, to an electric vehicle transmission having two forward speeds and a limp home feature whereby the vehicle is able to be operated in a low speed ratio in the event of system failure where fluid pressure sufficient for normal operation of the transmission is unavailable.

BACKGROUND OF THE INVENTION

The applicant has determined that it would be desirable to improve the efficiency of electric vehicle transmissions, and to provide a limp home feature so that electric vehicles can be operated, at least with reduced performance, in the event of system failure.

More specifically, the applicant has identified that there are inefficiencies in existing electric vehicle transmissions by use of electric fluid pumps. It would be desirable to use a mechanical fluid pump, however there exists a problem with electric vehicles in that mechanical fluid pumps may not be used in arrangements where they are driven by the electric drive motor of the vehicle, as the electric drive motor of an electric vehicle does not operate when the vehicle is stationary, and typical electric vehicle transmission require fluid pressure even at standstill.

It has also been determined that existing electric vehicle transmissions do not enable the vehicle to be driven in the event of system failure where there is not sufficient fluid pressure available for normal operation of the transmission.

Examples of the invention seek to solve, or at least ameliorate, one or more disadvantages of previous electric vehicle transmissions.

SUMMARY OF THE INVENTION

In accordance with one aspect of the present invention, there is provided an electric vehicle transmission, the transmission comprising an input shaft arranged to be driven by an electric motor, an output shaft arranged to transfer drive from the input shaft to driving wheels of the vehicle to which the transmission is fitted, a first clutch for engaging/disengaging a first gear ratio of the transmission, a second clutch for engaging/disengaging a second gear ratio of the transmission, and a fluid pump driven in response to rotation of the output shaft, wherein the first clutch is biased to engage said first gear ratio in the absence of pressure from the fluid pump.

Preferably, the second clutch is biased to disengage said second gear ratio in the absence of pressure from the fluid pump.

Preferably, the first gear ratio is a low speed ratio, the second gear ratio is a cruising speed ratio, and the said biasing of the first clutch provides a limp home feature whereby the vehicle is able to limp home in the low speed ratio in the event of system failure where sufficient fluid pressure is unavailable.

Preferably, each of the first and second gear ratios transmits drive from the input shaft to the output shaft by way of conventional gears. More preferably, the first gear ratio is transmitted by one gear mounted for rotation about an axis co-axial with the input shaft and another gear mounted for rotation on the output shaft, and the second gear is transmitted by one gear mounted for rotation about said axis co-axial with the input shaft and another gear mounted for rotation on the output shaft.

Preferably, the fluid pump is driven by direct mechanical engagement with the output shaft.

In a preferred example, the input shaft and output shaft rotate about axes which are parallel and mutually spaced.

Preferably, the transmission has only two forward speeds.

Preferably, the first and second clutches are axially spaced along the input shaft. Alternatively, the first and second clutches are concentrically mounted at the same axial location on the input shaft.

In a preferred example, the first clutch is biased to engage the first gear ratio by a first spring, and includes a piston movable in response to fluid pressure from the fluid pump to disengage the clutch.

Preferably, the second clutch is biased to disengage the second gear ratio by a second spring, and includes a piston movable in response to fluid pressure from the fluid pump to engage the clutch.

It is preferred that the output shaft is in direct mechanical driving engagement with a differential which drives said driving wheels of the vehicle.

Preferably, the transmission includes a differential pressure valve and single solenoid for controlling supply of fluid pressure from the fluid pump to the first and second friction clutches. More preferably, the transmission is arranged to control supply of fluid pressure from the fluid pump to the first and second friction clutches according to torque requirements based on engine speed and throttle position.

BRIEF DESCRIPTION OF THE DRAWINGS

The invention is described, by way of non-limiting example only, with reference to the accompanying drawings in which:

FIG. 1 is a diagrammatic cross-sectional view of an electric vehicle transmission in accordance with an example of the present invention.

DETAILED DESCRIPTION

With reference to FIG. 1, there is shown an electric vehicle transmission 10 having a first clutch 12 for engaging the transmission 10 in a first drive ratio, a second clutch 14 for engaging the transmission 10 in a second drive ratio, and a mechanical pump 16 which is driven by an output shaft 18 such that flow of fluid through the pump 16 is linked to road speed of the electric vehicle transmission. The first clutch 12 is a "normally on" clutch, and the second clutch 14 is a "normally off" clutch such that, in the absence of fluid pressure from the mechanical pump 16, the transmission is able to operate in the first drive ratio.

More specifically, the transmission 10 comprises an input shaft 20 arranged to be driven by an electric motor, and the output shaft 18 which is arranged to transfer drive from the input shaft 20 to driving wheels of the vehicle to which the transmission 10 is fitted. The first clutch 12 is in the form of a friction clutch for engaging/disengaging the first gear ratio of the transmission 10, and the second clutch is in the form of a friction clutch for engaging/disengaging the second gear ratio of the transmission 10. The fluid pump 16 is driven in response to rotation of the output shaft 18. The first clutch 12 is biased to engage the first gear ratio in the absence of pressure from the fluid pump 16.

The biasing of the first clutch 12 is achieved by way of a biasing means in the form of a first spring 22 which biases the first friction clutch 12 to its engaged condition. The first friction clutch 12 also includes a first piston 24 which moves in response to fluid pressure supplied from the fluid pump 16 to operate against the force of the first spring 22 so as to disengage the first clutch 12. In view of the first clutch 12 being biased to the engaged condition by operation of the first spring 22, fluid pressure from the fluid pump 16 is not required until the second gear ratio is required, thereby facilitating the use of the fluid pump 16 in the form of a mechanical pump driven in response to rotation of the output shaft 18. Pressure from the fluid pump 16 is not required at standstill of the vehicle (when the output shaft 18 does not rotate).

The second clutch 14 is biased by way of a biasing means in the form of a second spring 26 to disengage the second gear ratio of the transmission 10 in the absence of pressure from the fluid pump 16. The second clutch 14 also includes a second piston 28 which operates in response to fluid pressure from the fluid pump 16 to operate against the force of the second spring 26 to engage the second clutch 14. In changing from the first gear ratio to the second gear ratio, the first clutch 12 is disengaged while the second clutch 14 is engaged. In alternative examples, a one way clutch may be used to overspeed the first gear ratio rather than necessitating disengagement of the first clutch 12.

As can be seen from the sizes of the gears, the first gear ratio is a low speed ratio and the second gear ratio is a higher, cruising speed ratio. Accordingly, the biasing of the first clutch 12 provides a limp home feature whereby the vehicle is able to limp home in the low speed ratio in the event of system failure where sufficient fluid pressure from the fluid pump 16 is unavailable.

The first and second gear ratios each transmit drive from the input shaft 20 to the output shaft 18 by way of conventional gears, as opposed to using planetary gears. The use of conventional gears facilitates easy selection of multiple gear ratios (as may be required by different customers and vehicles). The first gear ratio is transmitted by gear 30*a* which is mounted for rotation about an axis co-axial with the input shaft 20, meshing with another gear 30*b* mounted for rotation on the output shaft 18. The second gear ratio is transmitted by one gear 32*a* mounted for rotation about said axis co-axial with the input shaft 20, meshing with another gear 32*b* mounted for rotation on the output shaft 18.

The input shaft 20 and output shaft 18 rotate about axes which are parallel and mutually spaced, and the fluid pump 16 is arranged at one end of the output shaft 18 to be driven by direct mechanical engagement with the output shaft 18. Although the example transmission depicted in the drawings has only two forward speeds, it will be appreciated by those skilled in the art that alternative examples of the invention may incorporate more than two forward speeds. Also, although the first and second clutches 12, 14 are axially spaced along the input shaft 20, in alternative arrangements the clutches may be concentrically mounted at the same axial location on the input shaft 20 (if axial space is restricted). The output shaft 18 is in direct mechanical driving engagement with a differential 34 which drives the driving wheels of the vehicle.

The transmission 10 may include a differential pressure valve and single solenoid for controlling supply of fluid pressure from the fluid pump 16 to the first and second friction clutches 12, 14. The differential pressure valve may serve the purpose of increasing the pressure from a relatively small fluid pump 16, rather than using a larger fluid pump which would reduce the efficiency of the transmission 10. The differential pressure valve and single solenoid may be used to control both the first clutch 12 and the second clutch 14 by controlling supply of fluid pressure from the fluid pump 16 according to transmission requirements. These requirements may be torque-based requirements using sensors for rotational speed of the electric motor and throttle position. For example, a control system of the transmission 10 may sense a high torque requirement when rotational speed of the electric motor is low and throttle position is high, controlling the solenoid and the differential pressure valve to supply high pressure to the friction clutch providing drive.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. An electric vehicle transmission, the transmission comprising an input shaft arranged to be driven by an electric motor, an output shaft arranged to transfer drive from the input shaft to driving wheels of the vehicle to which the transmission is fitted, a first clutch for engaging/disengaging a first gear ratio of the transmission, a second clutch for engaging/disengaging a second gear ratio of the transmission, and a mechanical fluid pump driven in response to rotation of the output shaft for pumping fluid in the transmission, wherein the second clutch is arranged to be operated in response to fluid pressure from the fluid pump, and the first clutch is biased to engage said first gear ratio in the absence of pressure from the fluid pump.

2. An electric vehicle transmission as claimed in claim 1, wherein the second clutch is biased to disengage said second gear ratio in the absence of pressure from the fluid pump.

3. An electric vehicle transmission as claimed in claim 2, wherein the second clutch is biased to disengage the second gear ratio by a second spring, and includes a piston movable in response to fluid pressure from the fluid pump to engage the clutch.

4. An electric vehicle transmission as claimed in claim 1, wherein the first gear ratio is a low speed ratio, the second gear ratio is a cruising speed ratio, and the said biasing of the first clutch provides a limp home feature whereby the vehicle is able to limp home in the low speed ratio in the event of system failure where sufficient fluid pressure is unavailable.

5. An electric vehicle transmission as claimed in claim 1, wherein each of the first and second gear ratios transmits drive from the input shaft to the output shaft by way of conventional gears.

6. An electric vehicle transmission as claimed in claim 5, wherein the first gear ratio is transmitted by one gear mounted for rotation about an axis co-axial with the input shaft and another gear mounted for rotation on the output shaft, and the second gear ratio is transmitted by one gear mounted for rotation about said axis co-axial with the input shaft and another gear mounted for rotation on the output shaft.

7. An electric vehicle transmission as claimed in claim 1, wherein the fluid pump is driven by direct mechanical engagement with the output shaft.

8. An electric vehicle transmission as claimed in claim 1, wherein the input shaft and output shaft rotate about axes which are parallel and mutually spaced.

9. An electric vehicle transmission as claimed in claim 1, wherein the transmission has only two forward speeds.

10. An electric vehicle transmission as claimed in claim 1, wherein the first and second clutches are axially spaced along the input shaft.

11. An electric vehicle transmission as claimed in claim 1, wherein the first and second clutches are concentrically mounted at the same axial location on the input shaft.

12. An electric vehicle transmission as claimed in claim 1, wherein the first clutch is biased to engage the first gear ratio by a first spring, and includes a piston movable in response to fluid pressure from the fluid pump to disengage the clutch.

13. An electric vehicle transmission as claimed in claim 1, wherein the output shaft is in direct mechanical driving engagement with a differential which drives said driving wheels of the vehicle.

14. An electric vehicle transmission as claimed in claim 1, including a differential pressure valve and single solenoid for controlling supply of fluid pressure from the fluid pump to the first and second friction clutches.

15. An electric vehicle transmission as claimed in claim 14, wherein the transmission is arranged to control supply of fluid pressure from the fluid pump to the first and second friction clutches according to torque requirements based on engine speed and throttle position.

16. An electric vehicle transmission as claimed in claim 1, wherein the transmission is arranged to control supply of fluid pressure from the fluid pump to the first and second friction clutches according to torque requirements based on engine speed and throttle position.

17. An electric vehicle transmission as claimed in claim 1, wherein the first gear ratio is transmitted by one gear mounted for rotation about an axis co-axial with the input shaft and another gear mounted for rotation on the output shaft, and the second gear ratio is transmitted by one gear mounted for rotation about said axis co-axial with the input shaft and another gear mounted for rotation on the output shaft.

18. An electric vehicle transmission as claimed in claim 1, wherein the second clutch is biased to disengage the second gear ratio by a second spring, and includes a piston movable in response to fluid pressure from the fluid pump to engage the clutch.

19. An electric vehicle transmission as claimed in claim 1, wherein the first clutch is arranged to be operated to a disengaged condition in response to fluid pressure from the fluid pump and the second clutch is arranged to be operated to an engaged condition in response to fluid pressure from the fluid pump.

* * * * *